US011823057B2

(12) United States Patent
Ma et al.

(10) Patent No.: US 11,823,057 B2
(45) Date of Patent: Nov. 21, 2023

(54) INTELLIGENT CONTROL METHOD FOR DYNAMIC NEURAL NETWORK-BASED VARIABLE CYCLE ENGINE

(71) Applicant: DALIAN UNIVERSITY OF TECHNOLOGY, Liaoning (CN)

(72) Inventors: Yanhua Ma, Liaoning (CN); Xian Du, Liaoning (CN); Ximing Sun, Liaoning (CN); Weiguo Xia, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 736 days.

(21) Appl. No.: 16/981,682

(22) PCT Filed: Feb. 28, 2020

(86) PCT No.: PCT/CN2020/077110
§ 371 (c)(1),
(2) Date: Sep. 16, 2020

(87) PCT Pub. No.: WO2021/134887
PCT Pub. Date: Jul. 8, 2021

(65) Prior Publication Data
US 2021/0201155 A1  Jul. 1, 2021

(30) Foreign Application Priority Data
Dec. 30, 2019  (CN) .......................... 201911388033.7

(51) Int. Cl.
*G06N 3/084* (2023.01)
*G06N 3/048* (2023.01)

(52) U.S. Cl.
CPC ............. *G06N 3/084* (2013.01); *G06N 3/048* (2023.01)

(58) Field of Classification Search
CPC .............................. G06N 3/048; G06N 3/084
See application file for complete search history.

(56) References Cited

U.S. PATENT DOCUMENTS 6,606,612 B1    8/2003  Rai

FOREIGN PATENT DOCUMENTS

| CN | 108416086 A | 8/2018 |
|----|-------------|--------|
| CN | 108457750 A | 8/2018 |

(Continued)

OTHER PUBLICATIONS

Geron, Aurelien, Hands-On Machine Learning with Scikit-Learn and TensorFlow, 2017. (Year: 2017).*

*Primary Examiner* — Marshall L Werner
(74) *Attorney, Agent, or Firm* — Muncy, Geissler, Olds & Lowe

(57) ABSTRACT

An intelligent control method for a dynamic neural network-based variable cycle engine is provided. By adding a grey relation analysis method-based structure adjustment algorithm to the neural network training algorithm, the neural network structure is adjusted, a dynamic neural network controller is constructed, and thus the intelligent control of the variable cycle engine is realized. A dynamic neural network is trained through the grey relation analysis method-based network structure adjustment algorithm designed by the present invention, and an intelligent controller of the dynamic neural network-based variable cycle engine is constructed. Thus, the problem of coupling between nonlinear multiple variables caused by the increase of control variables of the variable cycle engine and the problem that the traditional control method relies too much on model accuracy are effectively solved.

1 Claim, 7 Drawing Sheets

(56) References Cited

FOREIGN PATENT DOCUMENTS

| CN | 109709792 | A | 5/2019 |
| CN | 110579962 | A | 12/2019 |
| EP | 2098704 | A2 | 9/2009 |

\* cited by examiner

INTELLIGENT CONTROL METHOD FOR DYNAMIC NEURAL NETWORK-BASED VARIABLE CYCLE ENGINE

Technical Field

The present invention belongs to the technical field of control of aero-engines, and particularly relates to an intelligent control method for a dynamic neural network-based variable cycle engine.

Background

As an important part of an aero-engine, the control system is a key factor affecting the performance of the aero-engine. The variable cycle engine is integrated with the advantages of the turbojet engine and turbofan engine, and is added with variable geometry components. By adaptively adjusting the geometry, position and other parameters of these components, the variable cycle engine can have high specific thrust in the maneuvering flight phases of the aircraft such as acceleration, ascending and the like; and can have low fuel consumption rate in the subsonic cruise phase. However, due to the increase of variable components, the control variables are increased, and the structure of the controller is made more complicated; meanwhile, a strong coupling relationship is made between the nonlinear control variables of the variable cycle engine. How to solve the problem of coupling between control loops so that various variables may cooperate with each other to give full play to the overall performance and realize the multi-variable control of the variable cycle engine is a problem that is to be solved urgently, and is also the basis for the subsequent development of transient state control and synthesis control in the full flight envelop.

At present, for most of the multi-variable control systems for variable cycle engines at home and abroad, genetic algorithms (GA), teaching-learning-based optimization algorithms (TLBO) and other intelligent optimization algorithms are added or compensators are added on the basis of the traditional robust control, linear quadratic regulator (LQR) control and the like. Most of the existing control methods are based on accurate engine models, so the accuracy of the models is made to directly affect the control effect of the controller, and the problem of coupling between nonlinear variables cannot be solved well. Due to the nonlinear characteristics of the neural network, the neural network-based controller can well solve the problem of coupling between multiple variables. However, during training, the structure of hidden layers cannot be determined directly, if the structure is too large, too slow training and overfitting may be caused, and if the structure is too small, the required accuracy cannot be achieved. Therefore, in view of the above problem, it is of great significance to design a dynamic neural network controller which can overcome the structure defect of the neural network and is used for control of a variable cycle engine.

Summary

In view of the problem existing in the existing method for multi-variable control of the variable cycle engine, the present invention provides an intelligent control method for a dynamic neural network-based variable cycle engine. By adding a grey relation analysis method-based structure adjustment algorithm to the neural network training algorithm, the neural network structure is adjusted, a dynamic neural network controller is constructed, and thus the intelligent control of the variable cycle engine is realized.

The technical solution of the present invention is as follows:

An intelligent control method for a dynamic neural network-based variable cycle engine, comprising the following steps:

Step 1: constructing a training dataset of a dynamic neural network

Step 1.1: taking 0.01 s as a sample period, collecting the operating parameters of the variable cycle engine at the set height and power level angle(PLA), including an actual value and a desired value of a relative rotary speed of high pressure rotor $n_h$ of a controlled variable, a desired value and an actual value of a pressure ratio $\pi$ and control variables, wherein the control variables include the actual operating values of fuel flow $W_f$, nozzle throat area $A_8$, high-pressure turbine vane area $A_{HTG}$, angle of outlet guide vane $\alpha_f$, angle of core driven fan guide vane $\alpha_{CDFS}$, angle of compressor guide vane $\alpha_c$, angle of high-pressure compressor guide vane $\alpha_{turb}$, and core driven fan mixer area $A_{CDFS}$;

Step 1.2: performing data processing on the operating parameters of the variable cycle engine collected in the step 1.1, and deleting an outlier, i.e. exception value; and for a missing value, performing mean interpolation of the same class;

Step 1.3: taking the deviation $\Delta n_h$ between the desired value and the actual value of the relative rotary speed of high pressure rotor $n_h$ in the operating parameters of the variable cycle engine on which data processing is performed and the deviation $\Delta\pi$ between the desired value and the actual value of the pressure ratio $\pi$ of the engine as input parameters of the dynamic neural network, and taking the change value of the control variables as the target output of the dynamic neural network;

constructing a training dataset of the dynamic neural network:

$x=[\Delta n_h, \Delta\pi]$ $Y=[W_f, \alpha_{turb}, \alpha_f, A_8, \alpha_{CDFS}, A^{HTG}, \alpha_c]$ $h=[x, y]$ where x represents the input parameter of the dynamic neural network, Y represents the target output of the dynamic neural network, and h represents the training dataset of the dynamic neural network;

Step 1.4: normalizing the training dataset of the dynamic neural network:

$$h_{norm} = \frac{h - h_{min}}{h_{max} - h_{min}}$$

where $h_{norm}$, $h_{min}$ and $h_{max}$ respectively represent data normalized value of the training dataset h of the dynamic neural network, minimum value and maximum value;

Step 2: training the dynamic neural network

Step 2.1: taking 80% of the normalized training dataset $h_{norm}$ of the dynamic neural network obtained in the step 1.4 as the training sample, and 20% as the test sample;

Step 2.2: initializing the parameters of the dynamic neural network: number of neurons in an input layer, number of neurons in all hidden layers, number of neurons in an output layer, iteration number, training accuracy $\varepsilon$ and learning rate $\mu$;

Step 2.3: calculating the state and activation value of each layer of the dynamic neural network:

$$\begin{cases} a^{(l)}(k) = x(k), l = 1 \\ a^{(l)}(k) = f(z^{(l)}(k)), 2 \leq l \leq L \end{cases}$$

$$z^{(l)}(k) = \Theta^{(l)}(k)a^{(l-1)}(k) + b^{(l)}(k), 2 \leq l \leq L$$

where L represents the total number of layers of the dynamic neural network, $f(\cdot)$ represents the activation function of the neuron; $\Theta^{(l)}(k) \in R^{n_l \times n_{l-1}}$ represents the weight matrix of the $l-1^{th}$ layer to the $l^{th}$ layer when learning the input x(k) of the $k^{th}$ sample; $n_l$ represents the number of neurons in the $l^{th}$ layer;

$b^{(l)}(k) = (b^{(l)}_1(k), b^{(l)}_2(k), \ldots, b^{(l)}_{n_l}(k))^T \in R^{n_l}$ represents the bias of the $l-1^{th}$ layer to the $l^{th}$ layer when the input is x(k);

$z^{(l)}(k) = (z^{(l)}_1(k), z^{(l)}_2(k), \ldots, z^{(l)}_{n_l}(k))^T \in R^{n_l}$ represents the state of the neurons in the $l^{th}$ layer when the input is x(k); and $\alpha^{(l)}(k) = (\alpha^{(l)}_1(k), \alpha^{(l)}_2(k), \ldots, \alpha^{(l)}_{n_l}(k))_T \in R^{n_l}$ represents the activation value, i.e. output value, of the neurons in the $l^{th}$ layer when the input is x(k);

Step 2.4: calculating the error and loss of the output layer of the dynamic neural network:

$$e(k) = y(k) - o(k)$$

$$E(k) = \frac{1}{2}\|e(k)\|^2$$

where y(k) represents the desired output of the $k^{th}$ sample, o(k) represents the actual output generated by the dynamic neural network for the input x(k) of the $k^{th}$ sample, e(k) represents the error of the output layer at this time, E(k) represents the loss of the output layer when learning the $k^{th}$ sample currently, and $$\|\square\|$$

represents the norm operation;
calculating $\delta_{(l)}$ as the intermediate quality of error back propagation:

$$\begin{cases} \delta^{(l)}(k) = \delta^{(l+1)}(k)\Theta^{(l+1)}(k)a^{(l)}(k)(1 - a^{(l)}(k)), 2 \leq l < L \\ \delta^{(l)}(k) = -(y(k) - a^{(L)}(k))a^{(L)}(k)(1 - a^{(L)}(k)), l = L \end{cases}$$

updating the weight matrix and bias parameter matrix of the dynamic neural network:

$$\Theta^{(l)}(k+1) = \Theta^{(l)}(k) - \mu\delta^{(l)}(k)a^{(l-1)}(k)$$

$$b^{(l)}(k+1) = b^{(l)}(k) - \mu\delta^{(l)}(k)$$

Step 2.5: performing structure increase judgment of the dynamic neural network calculating the average loss $$E: E = \frac{1}{N}\sum_{k=1}^{N} E(k)$$

of all samples after training once, where N represents the total number of samples; calculating the average value $$\frac{1}{N_w}\sum_{i=1}^{N_w} E_i$$

of the loss of the output layer in a current sample window, where $N_w$ represents the size of a sliding window;

if $E_i > \varepsilon$ is met after the $i^{th}$ training, adding neurons from the hidden layer 1, i.e. layer 2 of the dynamic neural network, l=2; initializing the weight $\theta_{new}$ of the newly added neurons with a random number, and updating the number of neurons in the $l^{th}$ layer of the dynamic neural network and the weight matrix during the $i+1^{th}$ training:

$$n_l(i+1) = n_l(i) + 1$$

$$\Theta^{(l)}(i+1) = [\Theta^{(l)}(i), \theta_{new}]$$

after adding neurons to the current $l^{th}$ layer (1<l<L), if after continuous $N_w$ training, the loss change rate of the output layer of the dynamic neural network is less than the threshold $$\eta_3: \frac{1}{N_w}(E_{(i-N_w)} - E_i) < \eta_3$$

and $E_i > \varepsilon$ is met, going to the next hidden layer for neuron increase judgment, and ending structure increase judgment until l=L;

Step 2.6: after stopping adding neurons to the hidden layers of the dynamic neural network, performing structure pruning judgment; taking the hidden layer node output $\alpha^{(l)} = (\alpha^{(l)}_1, \alpha^{(l)}_2, \ldots, \alpha^{(l)})^T \in R^{n_l}$ as a comparison serial and the dynamic neural network output o=($o_1$, $o^2$, ..., $o_{nL}$) as a reference serial, calculating a correlation coefficient $\xi^l_n$ between $\alpha^{(l)} = (\alpha^{(l)}_1, \alpha^{(l)}_2, \ldots, \alpha^{(l)}_{n_l})^T \in R^{n_l}$ and o=($o_1$, $o_2$, ..., $o_{nL}$):

$$\xi^l_n(k) = \frac{\min_n\min_k|o(k) - a_n^{(l)}(k)| + \rho\max_n\max_k|o(k) - a_n^{(l)}(k)|}{|o(k) - a_n^{(l)}(k)| + \rho\max_n\max_k|o(k) - a_n^{(l)}(k)|}$$

where $\rho \in (0, +\infty)$ represents a distinguishing coefficient, and $\xi^l_n(k)(k=1, 2, \ldots, N)$ represents a grey relation serial;

calculating the relativity using the average value method, $$\gamma^l_n = \frac{1}{N}\sum_{k=1}^{N} \xi^l_n(k)$$

where $\gamma^l_2 \in [0,1]$ represents the relativity; comparing the relativity $\gamma^l_n$ between various neurons in the $l^{th}$ layer, deleting the neuron with the minimum relativity, updating the number $n_l$ of the neurons in the $l^{th}$ layer of the dynamic neural network and the weight matrix $\Theta^{(l)}$;

if the loss of the output layer of the dynamic neural network is increased too much so that $E_{i+1} - E_i > \eta_4$ after a certain neuron in the $l^{th}$ layer (1<l<L) is deleted, where $\eta_4 > 0$ represents the error floating threshold, withdrawing the deleting operation in the previous step and going to the structure adjustment judgment of the next hidden layer, and ending structure pruning judgment until l=L;

Step 2.7: if the error meets a given accuracy requirement, ending the training, and saving the weight matrix and bias parameter matrix of the dynamic neural network; and if the error does not meet the given accuracy requirement, proceeding the iterative training until the accuracy requirement is met or the specified iteration number is reached;

Step 2.8: based on the test sample, checking the currently trained dynamic neural network, and calculating the test error;

Step 3: constructing a dynamic neural network controller encapsulating the trained dynamic neural network as a variable cycle engine controller, and normalizing the deviation $\Delta n_h$ between the desired value and the actual value of the relative rotary speed of high pressure rotor $n_h$ of the controlled variable and the deviation $\Delta \pi$ between the desired value and the actual value of the pressure ratio $\pi$ of the engine and then taking same as input parameters of the dynamic neural network controller; and inversely normalizing the output parameters of the dynamic neural network and then taking same as the control variables of the variable cycle engine, to realize the intelligent control of the variable cycle engine.

The present invention has the advantageous effects that: a dynamic neural network is trained through the grey relation analysis method-based network structure adjustment algorithm designed by the present invention, and an intelligent controller of the dynamic neural network-based variable cycle engine is constructed. The problem of coupling between nonlinear multiple variables caused by the increase of control variables of the variable cycle engine and the problem that the traditional control method relies too much on model accuracy are effectively solved. Meanwhile, the structure is dynamically adjusted in the training process of the neural network, so that the network structure is simpler, and the operating speed and control accuracy are increased.

DETAILED DESCRIPTION

The embodiments of the present invention will be further described in detail below in combination with the drawings and the technical solution.

The method of the present invention comprises the following specific steps:

Step 1: constructing a training dataset of a dynamic neural network.

Step 1.1: taking 0.01 s as a sample period, collecting the operating parameters of the variable cycle engine at the set height and PLA, including an actual value and a desired value of a relative rotary speed of high pressure rotor $n_h$ of a controlled variable, a desired value and an actual value of a pressure ratio $\pi$, and control variables, wherein the control variables include the actual operating values of fuel flow $W_f$, nozzle throat area $A_8$, high-pressure turbine vane area $A_{HTG}$, angle of outlet guide vane $\alpha_f$, angle of core driven fan guide vane $\alpha_{CDFS}$, angle of compressor guide vane $\alpha_c$, angle of high-pressure compressor guide vane $\alpha_{turb}$, and core driven fan mixer area $A_{CDFS}$;

Step 1.2: performing data processing on the operating parameters of the variable cycle engine collected in the step 1.1, and deleting an outlier (exception value); and for a missing value, performing mean interpolation of the same class.

Step 1.3: taking the deviation $\Delta n_h$ between the desired value and the actual value of the relative rotary speed of high pressure rotor $n_h$ in the operating parameters of the variable cycle engine on which data processing is performed and the deviation $\Delta \pi$ between the desired value and the actual value of the pressure ratio $\pi$ of the engine as input parameters of the dynamic neural network, and taking the change value of the control variables as the target output of the dynamic neural network;

constructing a training dataset of a dynamic neural network:

x=[$\Delta n_h$, $\Delta \pi$]
y=[$W_f$, $\alpha_{turb}$, $\alpha_f$, $A_8$, $\alpha_{CDFS}$, $A_{CDFS}$, $A_{HTG}$, $\alpha_c$]
h=[x, y]

where x represents input parameter of the dynamic neural network, Y represents target output of the dynamic neural network, and h represents training dataset of the dynamic neural network.

Step 1.4: normalizing the training dataset of the dynamic neural network:

$$h_{norm} = \frac{h - h_{min}}{h_{max} - h_{min}}$$

where $h_{norm}$, $h_{min}$ and $h_{man}$ respectively represent data normalized value of the training dataset h of the dynamic neural network, minimum value and maximum value.

Figure 1:
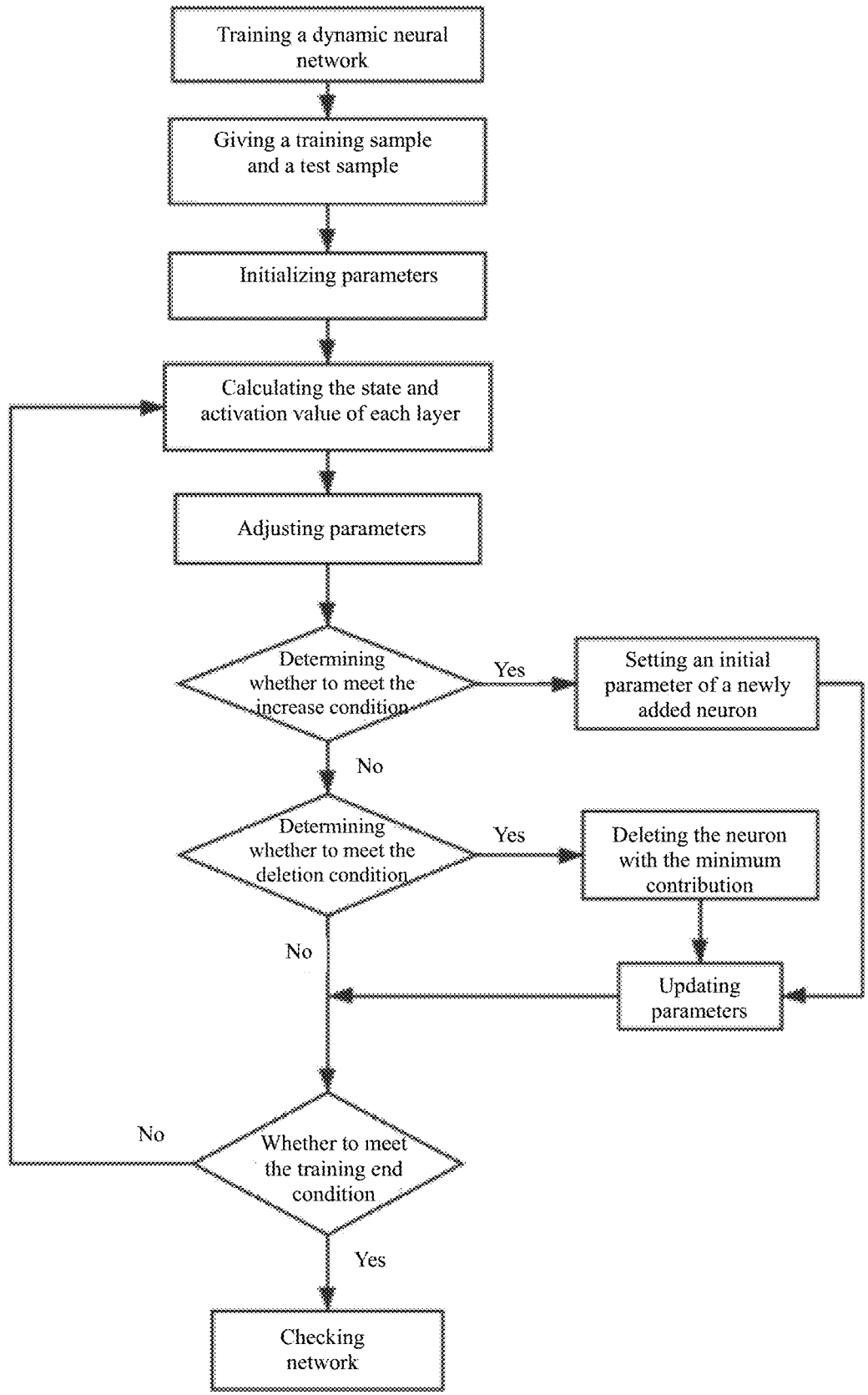
FIG. 1 shows a flow chart of a dynamic structure adjustment algorithm of a dynamic neural network.

As shown in FIG. 1, in the training process of the dynamic neural network, the steps of the structure adjustment algorithm are as follows.

Figure 2:
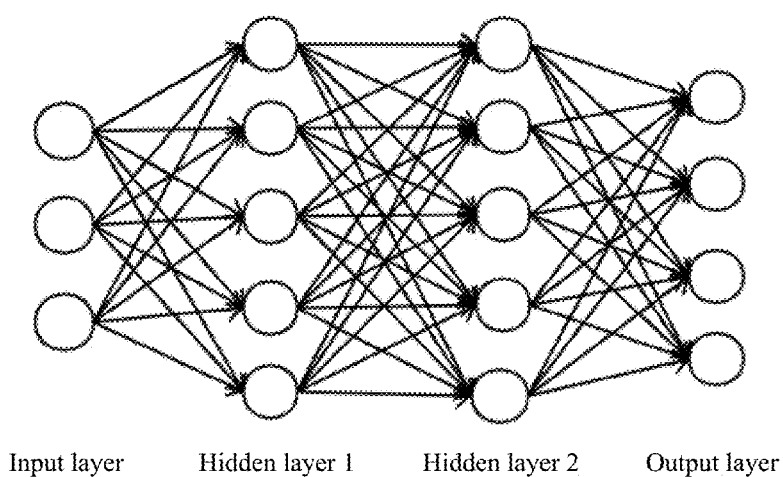
FIG. 2 shows a structural schematic diagram of the used dynamic neural network.

The structural schematic diagram of the used dynamic neural network is shown in FIG. 2.

Step 2: training the dynamic neural network.

Step 2.1: taking 80% of the normalized training dataset $h_{norm}$ of the dynamic neural network obtained in the step 1.4 as the training sample, and 20% as the test sample.

Step 2.2: initializing the training parameters of the dynamic neural network.

The number of neurons in the input layer is 2, the number of neurons in the output layer is 8, the hidden layer structure is initialized to 10, 5, 5 (three hidden layers, the number of neurons in all the layers is 10, 5, 5 respectively), the learning rate is μ=0.1, the iteration number is 850, the accuracy requirement is ε=1.0e−3. $\Theta^{(l)} \in R^{n_l \times n_{l-1}} (2 \leq l \leq L)$ represents the weight matrix of the l−1$^{th}$ layer to the l$^{th}$ layer, initialized as a random number matrix with the value between [0, 1], and $b^{(l)}=(b^{(l)}_1, b^{(l)}_2, \ldots, b^{(l)}_{n_l})^T \in R^{n_l}$ represents the bias of the l−1$^{th}$ layer to the l$^{th}$ layer, initialized as a random number matrix with the value between [0, 1].

$\Theta^{(2)}$:[2×10 double],$b^{(2)}$:[1×10 double]
$\Theta^{(3)}$:[10×5 double],$b^{(3)}$:[1×5 double]
$\Theta^{(4)}$:[5×5 double],$b^{(4)}$:[1×5 double]
$\Theta^{(5)}$:[5×8 double],$b^{(5)}$:[1×8 double]

Step 2.3: calculating the state and activation value of each layer of the dynamic neural network:

$$\begin{cases} a^{(l)}(k) = x(k), l = 1 \\ a^{(l)}(k) = f(z^{(l)}(k)), 2 \leq l \leq L \end{cases}$$

$$z^{(l)}(k) = \Theta^{(l)}(k)a^{(l-1)}(k) + b^{(l)}(k), 2 \leq l \leq L$$

where L=5 represents the total number of layers of the dynamic neural network, $f(\cdot)$ represents the activation function of the neuron, which is a sigmoid function; $\Theta^{(l)}(k) \in R^{n_l \times n_{l-1}}$ represents the weight matrix of the l−1$^{th}$ layer to the l$^{th}$ layer when learning the input x(k) of the k$^{th}$ sample; $n_l$ represents the number of neurons in the l$^{th}$ layer;

$b^{(l)}(k)=(b^{(l)}_1(k), b^{(l)}_2(k), \ldots, b^{(l)}_{n_l}(k))^T \in R^{n_l}$ represents the bias of the l−1$^{th}$ layer to the l$^{th}$ layer when the input is x(k);

$z^{(l)}(k)=(z^{(l)}_1(k), z^{(l)}_2(k), \ldots, z^{(l)}_{n_l}(k))^T \in R^{n_l}$ represents the state of the neurons in the l$^{th}$ layer when the input is x(k); and $\alpha^{(l)}(k)=(\alpha^{(l)}_1(k), \alpha^{(l)}_2(k), \ldots, \alpha^{(l)}_{n_l}(k))^T \in R^{n_l}$ represents the activation value, i.e. output value, of the neurons in the l$^{th}$ layer when the input is x(k).

Step 2.4: calculating the error and loss of the output layer of the dynamic neural network:

$$e(k) = y(k) - o(k)$$

$$E(k) = \frac{1}{2}\|e(k)\|^2$$

where y(k) represents the desired output of the k$^{th}$ sample, o(k) represents the actual output generated by the dynamic neural network for the input x(k) of the k$^{th}$ sample, e(k) represents the error of the output layer at this time, E(k) represents the loss of the output layer when learning the k$^{th}$ sample currently, and $\|\square\|$ represents the norm operation;

calculating $\delta^{(l)}$ as the intermediate quality of error back propagation:

$$\begin{cases} \delta^{(l)}(k) = \delta^{(l+1)}(k)\Theta^{(l+1)}(k)a^{(l)}(k)\left(1 - a^{(l)}(k)\right), 2 \leq l < L \\ \delta^{(l)}(k) = -\left(y(k) - a^{(L)}(k)\right)a^{(L)}(k)\left(1 - a^{(L)}(k)\right), l = L \end{cases}$$

updating the weight matrix and bias parameter matrix of the dynamic neural network:

$$\Theta^{(l)}(k+1) = \Theta^{(l)}(k) - \mu\delta^{(l)}(k)\alpha^{(l-1)}(k)$$

$$b^{(l)}(k+1) = b^{(l)}(k) - \mu\delta^{(l)}(k)$$

Step 2.5: performing structure increase judgment of the dynamic neural network calculating the average loss $$E: E = \frac{1}{N}\sum_{k=1}^{N} E(k)$$

of all samples after training once, where N represents the total number of samples; calculating the average value $$\frac{1}{N_w}\sum_{i=1}^{N_w} E_i$$

of the loss of the output layer in a current sample window, where $N_w$=10 represents the size of a sliding window;

if $E_i > \varepsilon$ is met after the i$^{th}$ training, adding neurons from the hidden layer 1, i.e. layer 2 of the dynamic neural network, l=2; initializing the weight $\theta_{new}$ of the newly added neurons with a random number, and updating the number of neurons in the l$^{th}$ layer of the dynamic neural network and the weight matrix during the i+1$^{th}$ training:

$$n_l(i+1) = n_l(i) + 1$$

$$\Theta^{(l)}(i+1) = [\Theta^{(l)}(i), \theta_{new}]$$

after adding neurons to the current l$^{th}$ layer (1<l<L), if after continuous $N_w$ training, the loss change rate of the output layer of the dynamic neural network is less than the threshold $$\eta_3: \frac{1}{N_w}(E_{(i-Nw)} - E_i) < \eta_3$$

and $E_i > \varepsilon$ is met, going to the next hidden layer for neuron increase judgment, and ending structure increase judgment until l=L.

Step 2.6: after stopping adding neurons to the hidden layers of the dynamic neural network, performing structure pruning judgment; taking the hidden layer node output $\alpha^{(l)}=(\alpha^{(l)}_1, \alpha^{(l)}_2, \ldots, \alpha^{(l)}_{n_l})^T \in R^{n_l}$ as a comparison serial and the dynamic neural network output $o=(o_1, o_2, \ldots, o_{nL})$ as a reference serial, calculating a correlation coefficient $\xi^l_n$ between $\alpha^{(l)}=(\alpha^{(l)}_1, \alpha^{(l)}_2, \ldots, \alpha^{(l)}_{n_l})^T \in R^{n_l \text{ and } o=(o_1, o_2, \ldots, o_{nL})}$:

$$\xi^l_n(k) = \frac{\min_n\min_k |o(k) - a^{(l)}_n(k)| + \rho\max_n\max_k |o(k) - a^{(l)}_n(k)|}{|o(k) - a^{(l)}_n(k)| + \rho\max_n\max_k |o(k) - a^{(l)}_n(k)|}$$

where ρ=0.15 represents a distinguishing coefficient, and $\xi^1_b(k)(k=1, 2, \ldots, N)$ represents a grey relation serial;

calculating the relativity using the average value method:

$$\gamma^l_n = \frac{1}{N}\sum_{k=1}^{N}\xi^l_n(k)$$

where $\gamma^l_n \in [0,1]$ represents the relativity; comparing the relativity $\gamma^l_n$ between various neurons in the $l^{th}$ layer, deleting the neuron with the minimum relativity, updating the number $n_l$ of the neurons in the $l^{th}$ layer of the dynamic neural network and the weight matrix $\Theta^{(l)}$;

if the loss of the output layer of the dynamic neural network is increased too much so that $E_{i+1} - E_i > \eta_4$ after a certain neuron in the $l^{th}$ layer (1<l<L) is deleted, where $\eta_4 > 0$ represents the error floating threshold, withdrawing the deleting operation in the previous step and going to the structure adjustment judgment of the next hidden layer, and ending structure pruning judgment until l=L.

Step 2.7: if the error meets a given accuracy requirement, ending the training, and saving the weight matrix and bias parameter matrix of the dynamic neural network; and if the error does not meet the given accuracy requirement, proceeding the iterative training until the accuracy requirement is met or the specified iteration number is reached.

Figure 3A:
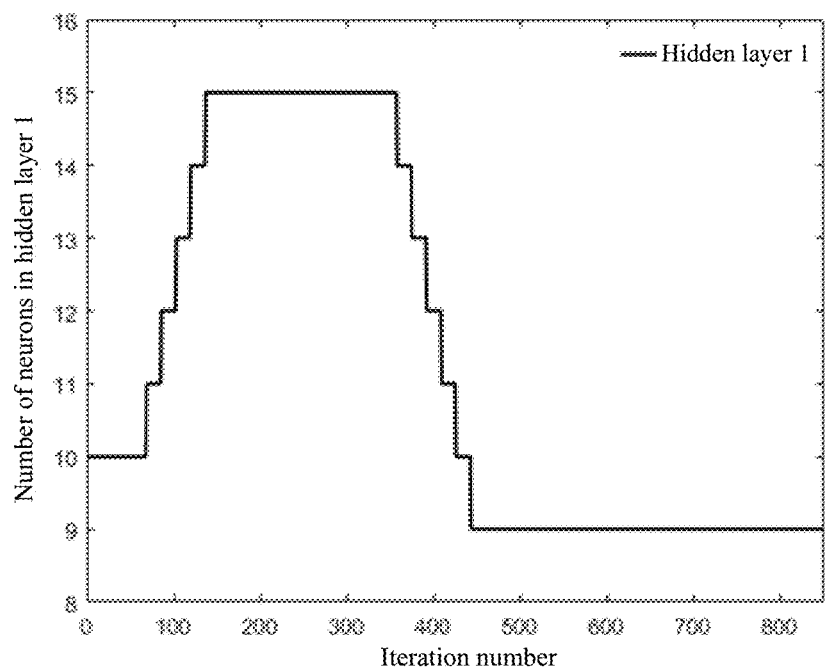
FIG. 3(a), FIG. 3(b) and FIG. 3(c) show change curves of the number of neurons in all hidden layers in the training process when using the method proposed by the present invention in the case where the initial height of the variable cycle engine is 0, the initial Mach number is 0, the PLA is 50°, when the number of the hidden layers of the dynamic neural network is 3, and the initial number of neurons in all layers is 10, 5, 5 respectively.
Figure 3B:
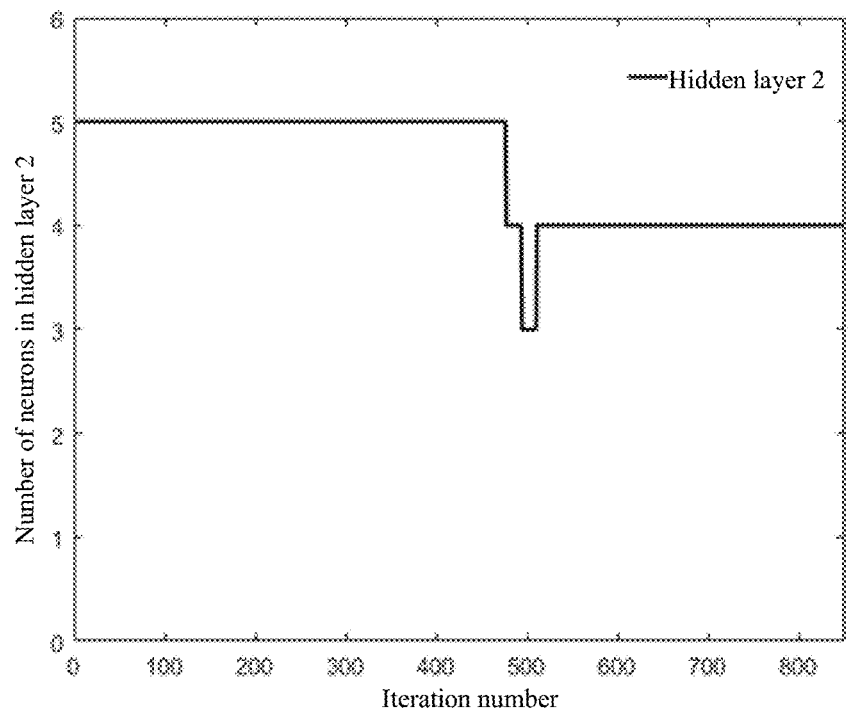
Figure 3C:
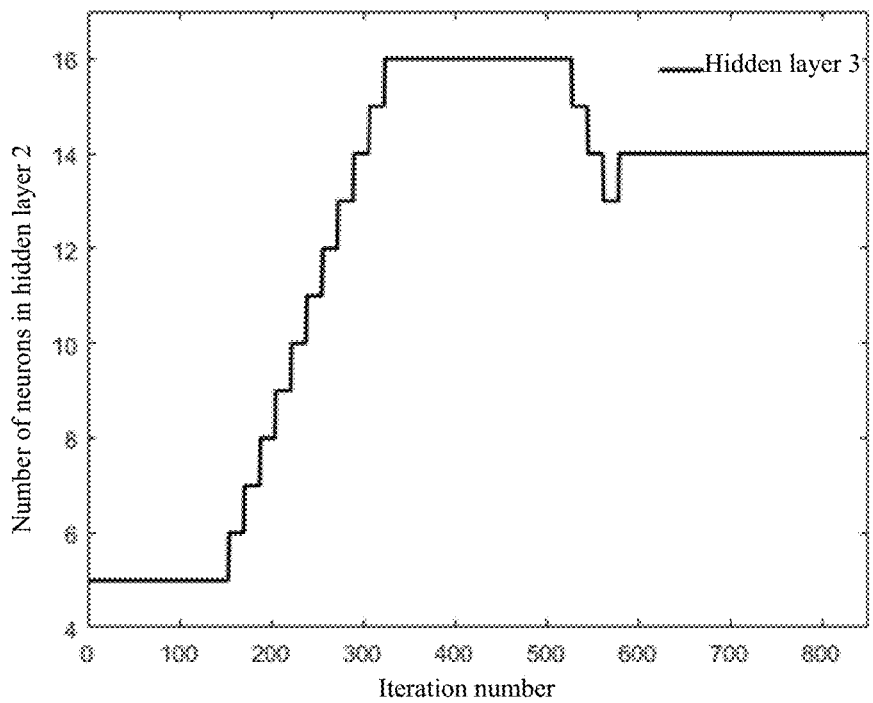

After the training, the hidden layer structure of the dynamic neural network is finally 9, 4, and 14. The changes of neurons of all hidden layers in the training process of the dynamic neural network are shown in FIG. 3(a), FIG. 3(b), and FIG. 3(c).

Figure 4:
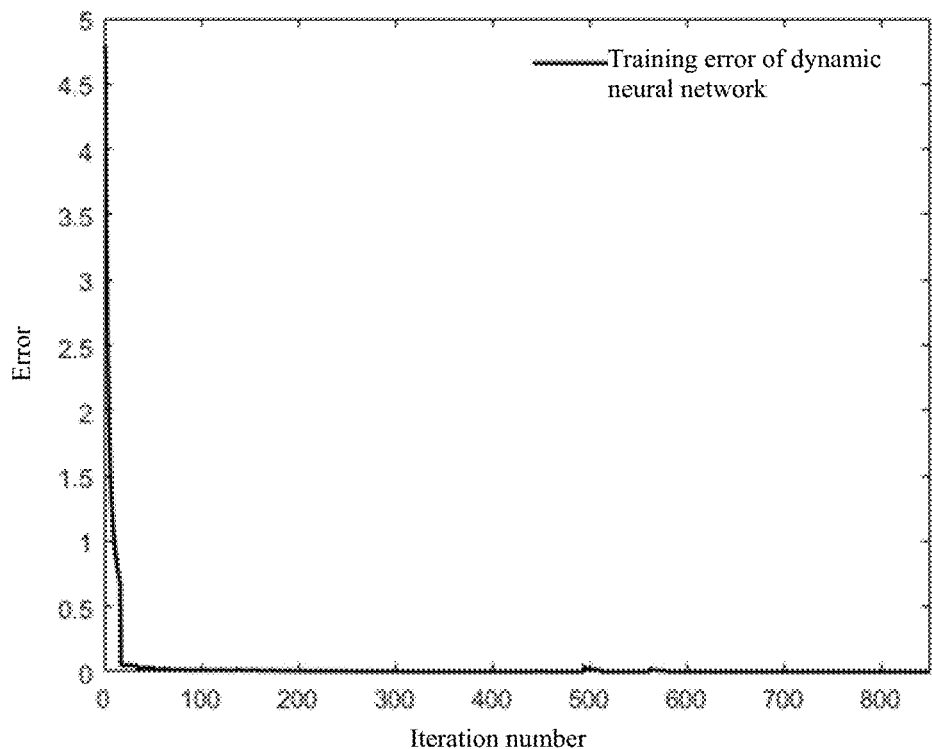
FIG. 4 shows an error change curve in the training process when using the method proposed by the present invention in the case where the initial height of the variable cycle engine is 0, the initial Mach number is 0, the PLA is 50°, when the number of the hidden layers of the dynamic neural network is 3, and the initial number of neurons in all layers is 10, 5, 5 respectively.

The error change curve in the training process of the dynamic neural network is shown in FIG. 4.

Step 2.8: based on the test sample, checking the currently trained dynamic neural network, and calculating the test error, the test error being 8.89e-04.

Figure 5:
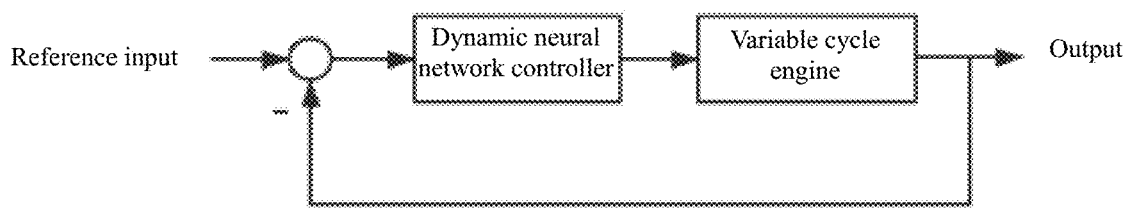
FIG. 5 is a block diagram of a closed-loop control system of the dynamic neural network of the variable cycle engine.

Step 3: constructing a dynamic neural network controller. As shown in FIG. 5, encapsulating the trained dynamic neural network as a variable cycle engine controller, and normalizing the deviation $\Delta n_h$ between the desired value and the actual value of the relative rotary speed of high pressure rotor $n_h$ of the controlled variable and the deviation $\Delta \pi$ between the desired value and the actual value of the pressure ratio $\pi$ of the engine and then taking same as input parameters of the dynamic neural network controller; and inversely normalizing the output parameters of the dynamic neural network and then taking same as the control variables of the variable cycle engine, to realize the intelligent control of the variable cycle engine.

Figure 6A:
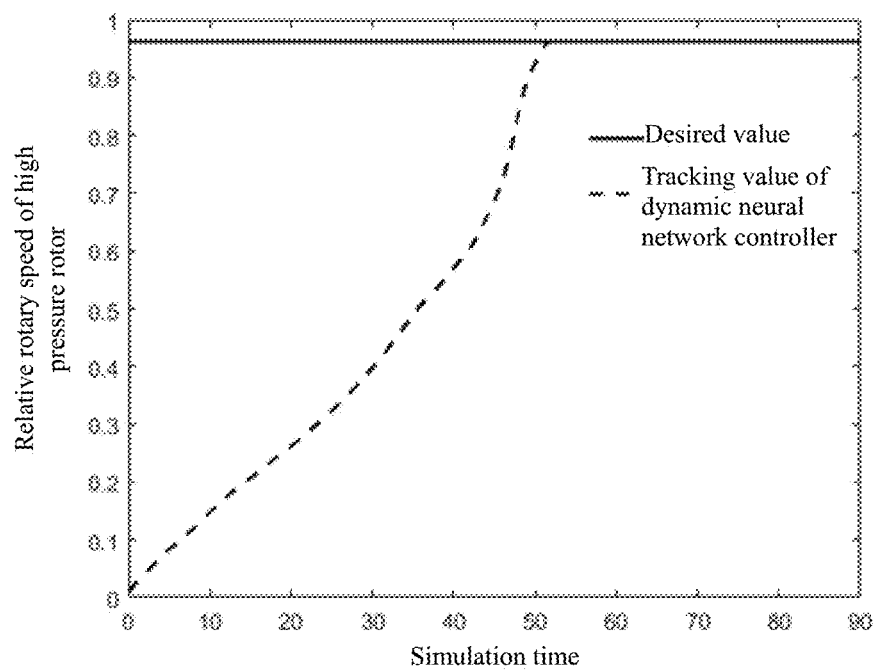
FIG. 6(a) and FIG. 6(b) are diagrams showing the effect of tracking the target value of the relative rotary speed of high pressure rotor of 0.9622 and the target value of the pressure ratio of 3.6 by means of the dynamic neural network controller in the case where the initial height of the variable cycle engine is 0, the initial Mach number is 0, and the PLA is 50°.
Figure 6B:
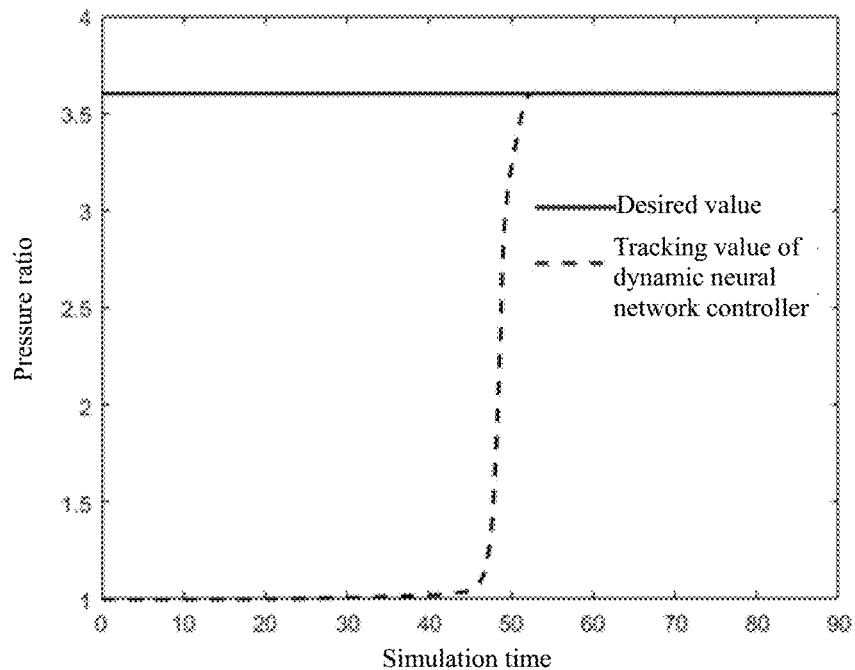

FIG. 6(a) and FIG. 6(b) are diagrams showing the effect of tracking the target value of the relative rotary speed of high pressure rotor of 0.9622 and the target value of the pressure ratio of 3.6 by means of the dynamic neural network controller in the case where the initial height of the variable cycle engine is 0, the initial Mach number is 0, and the PLA is 50°.

It can be seen from the simulation results of FIG. 6(a) and FIG. 6(b) that the dynamic neural network controller designed using the method proposed by the present invention can make the control accuracy of the relative rotary speed of high pressure rotor reach 99.999% and the control accuracy of the pressure ratio reach 99.713%.

Figure 7A:
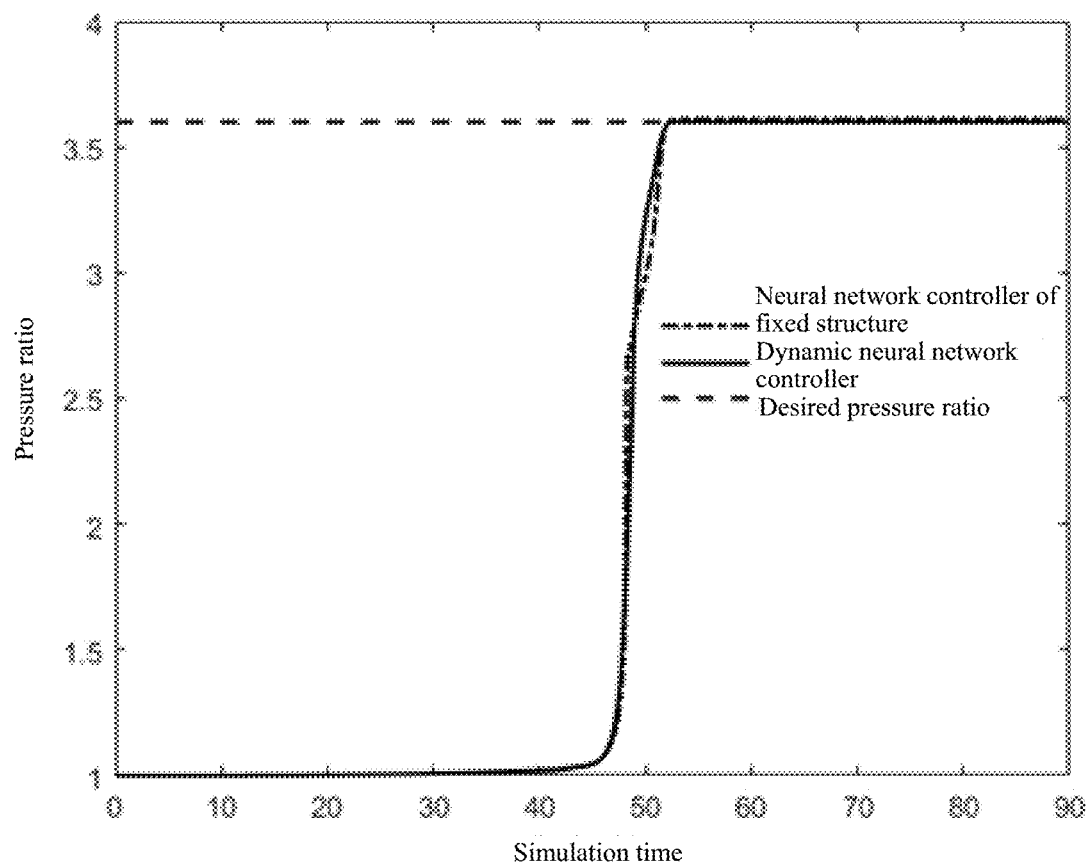
FIG. 7(a) and FIG. 7(b) are comparison diagrams showing the effect of controlling the target value of the relative rotary speed of high pressure rotor of 0.9622 and the target value of the pressure ratio of 3.6 by means of the dynamic neural network controller and the neural network controller of the fixed structure in the case where the initial height of the variable cycle engine is 0, the initial Mach number is 0, and the PLA is 50°.
Figure 7B:
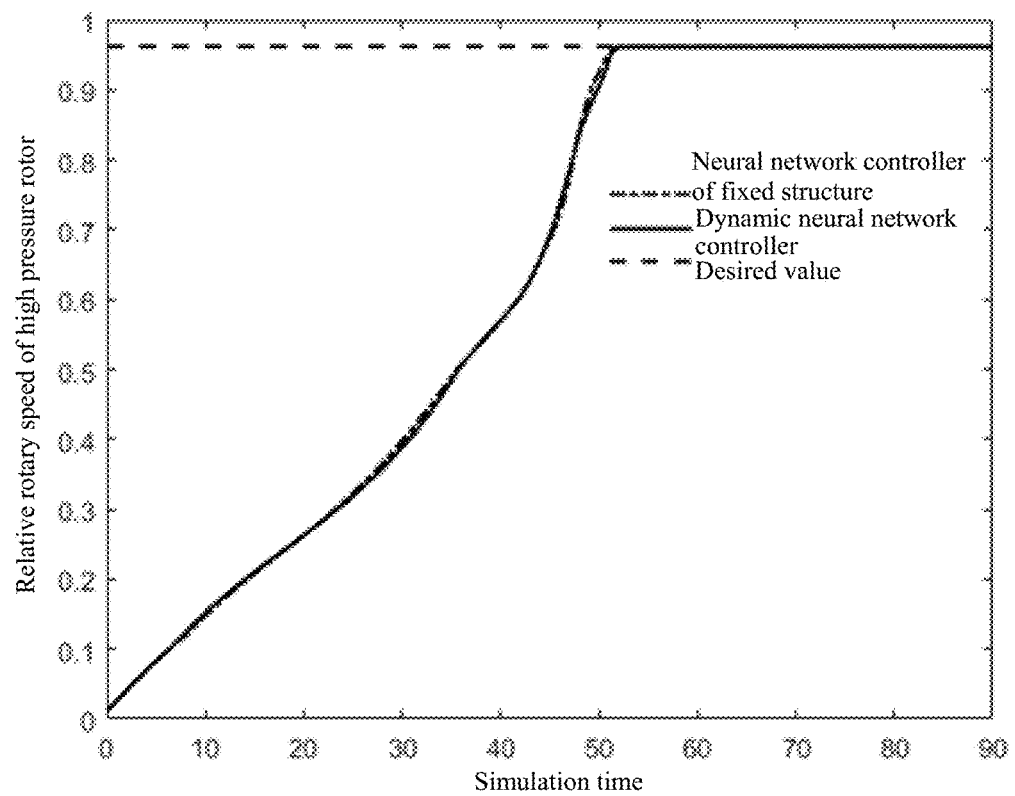

FIG. 7(a) and FIG. 7(b) are comparison diagrams showing the effect of controlling the target value of the relative rotary speed of high pressure rotor of 0.9622 and the target value of the pressure ratio of 3.6 by means of the dynamic neural network controller and the neural network controller of the fixed structure in the case where the initial height of the variable cycle engine is 0, the initial Mach number is 0, and the PLA is 50°.

As shown in FIG. 7(a) and FIG. 7(b), compared with the neural network controller of the fixed structure, the control error of the dynamic neural network controller for the rotary speed of high pressure rotor is reduced by 97.47%; and compared with the neural network controller of the fixed structure, the control error of the dynamic neural network controller for the pressure ratio is reduced by 90.10%.

In summary, in the control of the variable cycle engine, the dynamic neural network trained thought the grey relation analysis method-based dynamic structure adjustment algorithm is used to construct the dynamic neural network controller of the variable cycle engine, so the network structure is simpler, the control accuracy is higher, and the time to reach steady state is faster.

The invention claimed is:

1. An intelligent control method for a dynamic neural network-based variable cycle engine, comprising the following steps:

Step 1: constructing a training dataset of a dynamic neural network:

Step 1.1: taking 0.01 s as a sample period, collecting operating parameters of a variable cycle engine at a set height and power level angle (PLA), including an actual value and a desired value of a relative rotary speed of high pressure rotor $n_h$ of a controlled variable, a desired value and an actual value of a pressure ratio $\pi$, and control variables, wherein the control variables include actual operating values of fuel flow $W_f$, nozzle throat area $A_8$, high-pressure turbine vane area $A_{HTG}$, angle of outlet guide vane $\alpha_f$, angle of core driven fan guide vane $\alpha_{CDFS}$, angle of compressor guide vane $\alpha_c$, angle of high-pressure compressor guide vane $\alpha_{turb}$, and core driven fan mixer area $A_{CDFS}$;

Step 1.2: performing data processing on the operating parameters of the variable cycle engine collected in step 1.1, and deleting an outlier, i.e., exception value; and for a missing value, performing mean interpolation of a same class;

Step 1.3: taking a deviation $\Delta n_h$ between the desired value and the actual value of the relative rotary speed of high pressure rotor $n_h$ in the operating parameters of the variable cycle engine on which data processing is performed and a deviation $\Delta \pi$ between the desired value and the actual value of the pressure ratio $\pi$ of the variable cycle engine as input parameters of the dynamic neural network, and taking a change value of the control variables as a target output of the dynamic neural network;

constructing a training dataset of the dynamic neural network:

x=[$\Delta n_h$, $\Delta \pi$]

y=[$W_f$, $\alpha_{turb}$, $\alpha_f$, $A_8$, $\alpha_{CDFS}$, $A_{CDFS}$, $A_{HTG}$, $\alpha_c$]

h=[x, y]

where x represents the input parameters of the dynamic neural network, y represents the target output of the dynamic neural network, and h represents the training dataset of the dynamic neural network;

Step 1.4: normalizing the training dataset of the dynamic neural network:

$$h_{norm} = \frac{h - h_{min}}{h_{max} - h_{min}}$$

where $h_{norm}$, $h_{min}$ and $h_{max}$ respectively represent data normalized value of the training dataset h of the dynamic neural network, minimum value and maximum value;

Step 2: training the dynamic neural network:

Step 2.1: taking 80% of data normalized value $h_{norm}$ of training dataset h of the dynamic neural network obtained in step 1.4 as a training sample, and 20% as a test sample;

Step 2.2: initializing parameters of the dynamic neural network: number of neurons in an input layer, number of neurons in all hidden layers, number of neurons in an output layer, iteration number, training accuracy ε and learning rate μ;

Step 2.3: calculating a state and activation value of each layer of the dynamic neural network:

$$\begin{cases} a^{(l)} = x(k), l = 1 \\ a^{(l)} = f(z^{(l)}(k)), 2 \le l \le L \end{cases}$$

$$z^{(l)}(k) = \Theta^{(l)}(k)a^{(l-1)}(k) + b^{(l)}(k), 2 \le l \le L$$

where L represents a total number of layers of the dynamic neural network, $f(\cdot)$ represents an activation function of a neuron; $\Theta^{(l)}(k) \in R^{n_l \times n_{l-1}}$ represents a weight matrix of the $l-1^{th}$ layer to the $l^{th}$ layer when learning an input x(k) of a $k^{th}$ sample; $n_l$ represents a number of neurons in the $l^{th}$ layer;

$b^{(l)}(k) = (b^{(l)}_1(k), b^{(l)}_2(k), \ldots, b^{(l)}_{n_l}(k))^T \in R^{n_l}$ represents a bias of the $l-1^{th}$ layer to the $l^{th}$ layer when the input is x(k);

$z^{(l)}(k) = (z^{(l)}_1(k), z^{(l)}_2(k), \ldots, z^{(l)}_{n_l}(k))^T \in R^{n_l}$ represents a state of the neurons in the $l^{th}$ layer when the input is x(k); and $\alpha^{(l)}(k) = (\alpha^{(l)}_1(k), \alpha^{(l)}_2(k), \ldots, \alpha^{(l)}_{n_l}(k))^T \in R^{n_l}$ represents an activation value, i.e., output value, of the neurons in the $l^{th}$ layer when the input is x(k);

Step 2.4: calculating an error and loss of the output layer of the dynamic neural network:

$$e(k) = y(k) - o(k)$$

$$E(k) = \frac{1}{2}\|e(k)\|^2$$

where y(k) represents a desired output of the $k^{th}$ sample, o(k) represents an actual output generated by the dynamic neural network for the input x(k) of the $k^{th}$ sample, e(k) represents the error of the output layer at this time, E(k) represents the loss of the output layer when learning the $k^{th}$ sample currently, and $\|\cdot\|$ represents the norm operation;

calculating $\delta^{(l)}$ as an intermediate quality of error back propagation:

$$\begin{cases} \delta^{(l)}(k) = \delta^{(l+1)}(k)\Theta^{(l+1)}(k)a^{(l)}(k)(1 - a^{(l)}(k)), 2 \le l < L \\ \delta^{(l)}(k) = -(y(k) - a^{(L)}(k))a^{(L)}(k)(1 - a^{(L)}(k)), l = L \end{cases}$$

updating the weight matrix and bias parameter matrix of the dynamic neural network:

$$\Theta^{(l)}(k+1) = \Theta_{(l)}(k) - \mu\delta^{(l)}(k)a^{(l-1)}(k)$$

$$b^{(l)}(k+1) = b^{(l)}(k) - \mu\delta^{(l)}(k)$$

Step 2.5: performing structure increase judgment of the dynamic neural network:

calculating an average loss $$E: E = \frac{1}{N}\sum_{k=1}^{N} E(k)$$

of all samples after training once, where N represents a total number of samples; calculating an average value $$\frac{1}{N_w}\sum_{i=1}^{N_w} E_i$$

or the loss or the output layer in a current sample window, where $N_W$ represents a size of a sliding window;

if $E_i > \varepsilon$ is met after an $i^{th}$ training, adding neurons from hidden layer 1, i.e., layer 2 of the dynamic neural network, l=2; initializing a weight $\Theta_{new}$ of the newly added neurons with a random number, and updating the number of neurons in the $l^{th}$ layer of the dynamic neural network and the weight matrix during an $i+1^{th}$ training:

$$n_l(i+1) = n_l(i) + 1$$

$$\Theta^{(l)}(i+1) = [\Theta^{(l)}(i), \Theta_{new}]$$

after adding neurons to the current $l^{th}$ layer (1<l<L), if after continuous $N_w$ training, a loss change rate of the output layer of the dynamic neural network is less than a threshold $$\eta_3 : \frac{1}{N_w}(E_{(i-N_w)} - E_i) < \eta_3 \text{ and } E_i > \varepsilon$$

is met, going to a next hidden layer for neuron increase judgment, and ending structure increase judgment when l=L;

Step 2.6: after stopping adding neurons to the hidden layers of the dynamic neural network, performing structure pruning judgment; taking a hidden layer node output $\alpha^{(l)} = (\alpha^{(l)}_1, \alpha^{(l)}_2, \ldots, \alpha^{(l)}_{n_l})^T \in R^{n_l}$ as a comparison serial and the dynamic neural network output $o = (o_1, o_2, \ldots, o_{n_l})$ as a reference serial, calculating a correlation coefficient $\xi_n^l$ between $$a^{(l)} = (a^{(l)}_1, a^{(l)}_2, \ldots, a^{(l)}_{n_l})^T \in R^{n_l} \text{ and } o = (o_1, o_2, \ldots, o_{n_l}):$$

$$\xi_n^l(k) = \frac{\min_n\min_k |o(k) - a_n^{(l)}(k)| + \rho\max_n\max_k |o(k) - a_n^{(l)}(k)|}{|o(k) - a_n^{(l)}(k)| + \rho\max_n\max_k |o(k) - a_n^{(l)}(k)|}$$

where $\rho \in (0, +\infty)$ represents a distinguishing coefficient, and $\xi_n^l(k)(k=1,2,\ldots,N)$ represents a grey relation serial;

calculating a relativity using the average value method:

$$\gamma_n^l = \frac{1}{N}\sum_{k=1}^{N}\xi_n^l(k)$$

where $\gamma_n^l \in [0,1]$ represents the relativity; comparing the relativity $\gamma_n^l$ between various neurons in the $l^{th}$ layer, deleting a neuron with a minimum relativity, updating the number $n_l$ of the neurons in the $l^{th}$ layer of the dynamic neural network and the weight matrix $\Theta^{(l)}$;

if the loss of the output layer of the dynamic neural network is increased too much so that $E_{i+1} - E_i > \eta_4$ after a certain neuron in the $l^{th}$ layer ($1 < l < L$) is deleted, where $\eta_4 > 0$ represents an error floating threshold, withdrawing the deleting operation in the previous step and going to a structure adjustment judgment of the next hidden layer, and ending structure pruning judgment when $l=L$;

Step 2.7: if the error meets a given accuracy requirement, ending the training, and saving the weight matrix and bias parameter matrix of the dynamic neural network; and if the error does not meet the given accuracy requirement, proceeding the iterative training until the accuracy requirement is met or the specified iteration number is reached;

Step 2.8: based on the test sample, checking the currently trained dynamic neural network, and calculating a test error;

Step 3: constructing a dynamic neural network controller:

encapsulating the trained dynamic neural network as a variable cycle engine controller, and normalizing the deviation $\Delta n_h$, between the desired value and the actual value of the relative rotary speed of high pressure rotor $n_h$ of the controlled variable and the deviation $\Delta \pi$ between the desired value and the actual value of the pressure ratio $\pi$ of the variable cycle engine and then taking the same as input parameters of the dynamic neural network controller; and inversely normalizing output parameters of the dynamic neural network and then taking the control variables of the variable cycle engine, to realize intelligent control of the variable cycle engine.

\* \* \* \* \*